United States Patent [19]

McMurtrey

[11] Patent Number: 4,662,645
[45] Date of Patent: May 5, 1987

[54] BICYCLE FORK

[75] Inventor: David K. McMurtrey, Maysville, Ky.

[73] Assignee: Wald Manufacturing Co., Inc., Maysville, Ky.

[21] Appl. No.: 801,607

[22] Filed: Nov. 25, 1985

[51] Int. Cl.$^4$ ............................................. B62K 21/02
[52] U.S. Cl. .................................................. 280/279
[58] Field of Search ................. 280/276, 279, 284, 288

[56] References Cited

U.S. PATENT DOCUMENTS 4,323,263  4/1982  Cook et al. .......................... 280/279

FOREIGN PATENT DOCUMENTS

| 418091 | 11/1910 | France | 280/279 |
| 1035369 | 8/1953 | France | 280/276 |
| 21668 | of 1896 | United Kingdom | 280/279 |
| 27947 | of 1897 | United Kingdom | 280/279 |
| 586784 | 3/1947 | United Kingdom | 280/279 |

OTHER PUBLICATIONS

Japan's Bicycle Guide, vol. 34, 1984, pp. 111-121.

TradeWinds, "Taiwan Bicycles & Parts", Buyers' Guide 1985.

Primary Examiner—John J. Love
Assistant Examiner—Charles R. Watts
Attorney, Agent, or Firm—Wood, Herron & Evans

[57]            ABSTRACT

A front fork for a bicycle includes a cylindrical fork tube adapted to mount to the bicycle frame and support the handlebars, and a pair of spaced fork legs connected to the fork tube which straddle the front bicycle wheel and mount to its axle. Each fork leg comprises an upper section of substantially circular cross section welded at one end to the fork tube and integrally connected at the other end to the upper end of an elongated lower section. The elongated lower section of each fork leg is formed with a longitudinally extending crease formed by bending a portion of the outer wall of the fork leg radially inwardly in a U-shape toward its hollow center. The depth of the crease increases from the upper end to the lower end of the elongated lower section so that the fork legs taper inwardly from top to bottom for mounting to the front wheel axle.

1 Claim, 6 Drawing Figures

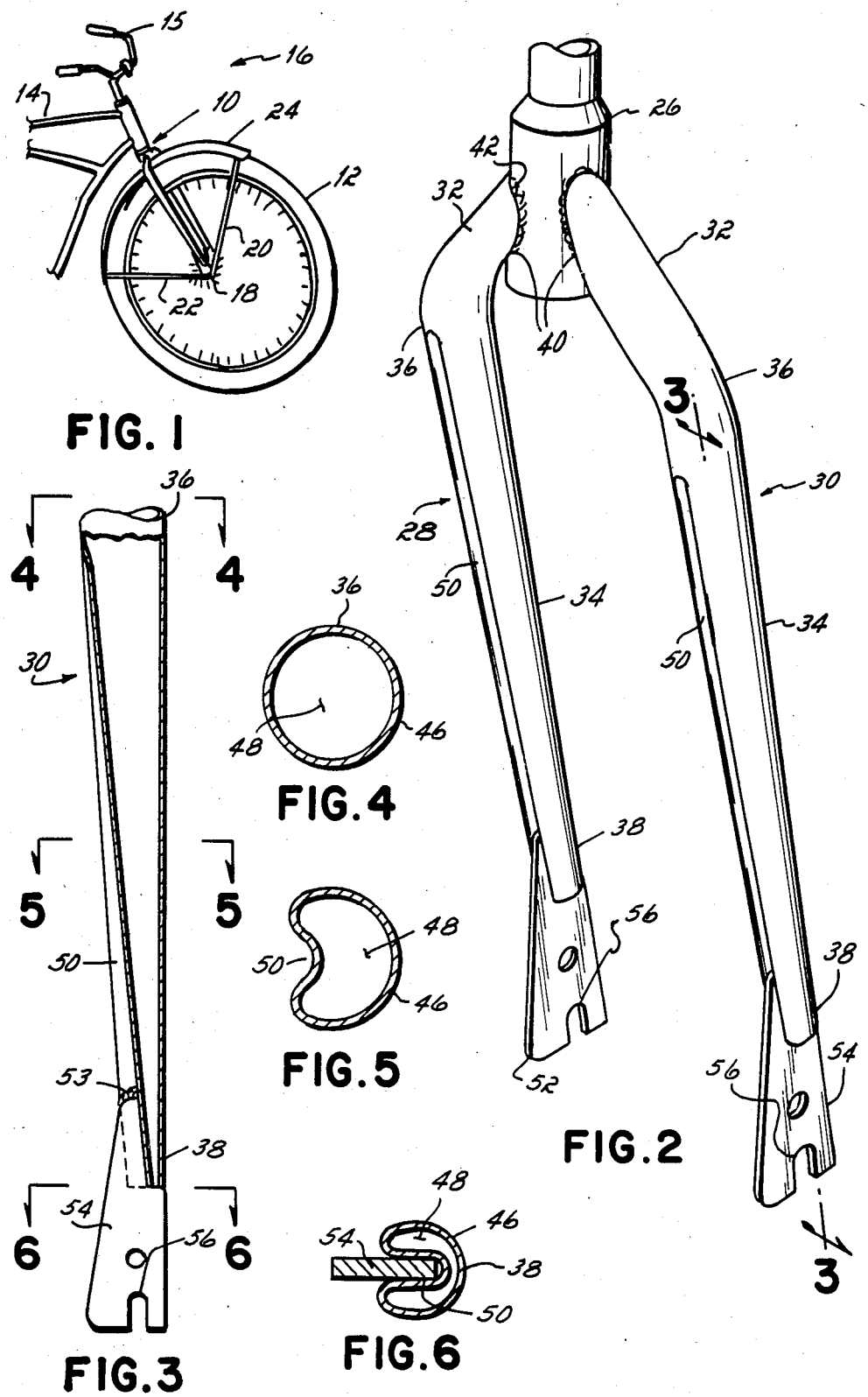

BICYCLE FORK

BACKGROUND OF THE INVENTION

This invention relates to bicylces, and, more particularly, to an improved front fork for mounting the front wheel of a bicycle to the bicycle frame.

The front fork of bicycles generally comprises a fork tube adapted to mount to the bicycle frame and support the handlebars, and a pair of spaced legs connected to the fork tube which straddle the front bicycle wheel and mount to its axle. One type of front fork includes tapered legs which decrease in cross section from the upper end to the lower end. The upper end of each tapered front fork leg is welded to a plate or fork crown which supports the fork tube, and their lower ends are usually flattened and then slotted to receive the front wheel axle, or forged fork stays are welded thereto for attachment to the front wheel axle.

One problem with forks having tapered legs is that the tapering is accomplished by a swaging operation which substantially increases the hardness and brittleness of the fork legs. The brittleness problem may be alleviated to some degree by tempering the fork legs, but this adds to the cost of the front fork.

A tubular front fork design has been proposed in the prior art as an alternative to the tapered leg front forks for heavy duty applications such as cruiser style bicycles or industrial three wheel vehicles. This front fork comprises a cylindrical fork tube connected to a pair of spaced fork legs each having a tubular shape with a constant, substantially circular cross section. The fork legs are welded or brazed directly to the fork tube which provides a strong connection therebetween. Fork stays are then welded to the lower end of each of the fork legs for mounting to the front wheel axle.

Although the tubular front fork described above is stronger than front forks having tapered legs, other problems are created. The front and rear straps or braces which support the front fender of the bicycle include holes at their terminal ends which slide over the front wheel axle against the front fork legs. When assembled, the fender braces are disposed at an acute angle with respect to the fork legs. The constant cross section fork legs of the tubular front fork design interfere with the rear fender brace preventing it from sliding over the front wheel axle against the fork stay welded to the fork legs. This presents a problem in mounting the front fender to the wheel. In addition, the tubular legs are not as attractive as the tapered legs of other fork designs, such as described above, which detracts from the overall appearance of the bicycle.

SUMMARY OF THE INVENTION

It is therefore among the objects of this invention to provide a front bicycle fork which is durable and strong enough for heavy duty applications, which includes tapered fork legs and which does not interfere with the front or rear braces which mount the fender to the front wheel of the bicycle.

These objects are accomplished in a front fork according to this invention which comprises a cylindrical fork tube and a pair of spaced fork legs each having a tubular upper section of constant cross section and a tapered, elongated lower section. The tubular upper section of each leg is fixedly connected by welding or brazing to the fork tube. The elongated lower section of each fork leg includes an upper end integral with the tubular upper section, and a lower end adapted for mounting to the axle of the front wheel of the bicycle.

The elongated lower section of each fork leg is formed with a hollow interior defined by an outer wall which tapers inwardly, or decreases in cross section, from the upper end of the elongated lower section to its lower end. This inward taper of the fork legs is accomplished by forming a crease along the length of each elongated lower section wherein a portion of the outer wall is bent inwardly, within the hollow interior, in a U-shape. The depth of the crease, or amount of the outer wall bent inwardly within the hollow interior of each leg, is greater toward the lower end of the elongated lower section than its upper end so that the elongated lower sections taper inwardly from top to bottom.

In order to mount the front fork to the axle of the front bicycle wheel, a mounting stay or plate is inserted into the crease formed in each leg, near the lower end, and welded thereto. The mounting plates are formed with slots which receive the axle of the front wheel for mounting to the front fork.

The front fork of this invention therefore avoids the problems of prior art front forks described above. A strong, durable connection is provided between the tubular upper section of each fork leg and the fork tube which avoids the relatively weak connection between the fork legs and fork tube found in prior art front forks having tapered legs.

In addition, the fork legs of this invention are tapered to provide a more desirable appearance without the need for tempering to increase strength. The smaller cross section at the lower end of the tapered legs also avoids interference with both the front and rear braces which support the front wheel fender.

DESCRIPTION OF THE DRAWINGS

The structure, operation and advantages of a presently preferred embodiment of this invention will become further apparent upon consideration of the following description taken in conjunction with the accompanying drawings wherein:

FIG. 1 is a schematic, perspective view of a bicycle having the front fork of this invention;

FIG. 2 is a perspective view looking at the rear of the front fork herein;

FIG. 3 is a partial cross sectional view of one of the fork legs taken generally along line 3—3 of FIG. 2;

FIG. 4 is a top view of a fork leg, in partial cross section, taken generally along line 4—4 of FIG. 3;

FIG. 5 is a cross sectional view of a fork leg taken generally along line 5—5 of FIG. 3; and FIG. 6 is a cross sectional view of the connection between a fork leg and fork stay taken generally along line 6—6 of FIG. 3.

DETAILED DESCRIPTION OF THE INVENTION

Referring now to the drawings, the front bicycle fork 10 of this invention is adapted to mount the front wheel 12 to the frame 14 of a bicycle 16. As described in more detail below, the front fork 10 mounts to the axle 18 of the front wheel 12 and supports the bicycle handlebars 15. The axle 18 also receives the slotted ends of a pair of spaced front fender braces 20 and rear fender braces 22 which mount the front wheel fender 24.

The front fork 10 comprises a substantially cylindrical fork tube 26 which is adapted to mount to the frame 14 of the bicycle 16. A pair of spaced legs 28, 30 are mounted to the fork tube 26 which straddle the front bicycle wheel 12 and extend downwardly to the front wheel axle 18.

As shown in FIG. 2, the legs 28, 30 are mirror images of one another and each comprises a cylindrical or tubular-shaped upper section 32 and an integral, elongated lower section 34 having an upper end 36 joined to the tubular upper section 32 and a lower end 38. The upper section 32 has a constant, substantially circular cross section and extends outwardly at an acute angle relative to the fork tube 26, and then downwardly to the integral upper end 36 of the elongated lower section 34. The free end 40 of the upper section 32 of each leg 28, 30 is shaped to engage the outer wall of the fork tube 26 where it is secured in place by brazing or welding such as shown by the weldment 42.

Referring now to FIGS. 2-6, each of the legs 28, 30 includes an outer wall 46 defining a hollow interior 48. As shown in FIGS. 2 and 3, the legs 28, 30 taper inwardly from their upper end 36 to their lower end 38. This taper is achieved by forming a crease 50 along substantially the entire length of the elongated lower section 34 of each leg 28, 30 wherein a portion of the outer wall 46 is bent inwardly, into the hollow interior 48, in substantially a U-shape. The depth of the crease 50 increases from the upper end 36 to the lower end 38 of the elongated lower section 34 so that the overall cross section of the elongated lower section 34 decreases from top to bottom. As shown in FIG. 6, the crease 50 extends furthest into the hollow interior 48 near the lower end 38, and is relatively shallow toward the upper end 36 of elongated lower section 34 as shown in FIG. 5. The legs 28, 30 have no crease 50 at the point of connection between their upper ends 36 and the upper section 32. See FIG. 4.

The front fork 10 is adapted to mount to the axle 18 of front wheel 12 by a pair of fork stays or plates 52, 54. Each fork plate 52 is inserted within the crease 50 at the lower end 38 of elongated lower section 34 and then welded or brazed thereto as at weldment 53 shown in FIG. 3. A slot 56 is formed in each fork plate 52, 54 which receives the front wheel axle 18. The front and rear fender braces 20, 22 are then slid over the axle 18 and secured thereto against the fork plates 52, 54 by a nut (not shown).

The constant, generally circular cross section of the tubular upper section 32 of each leg 28, 30 permits a secure welded connection to the fork tube 26 allowing the front fork 10 of this invention to be used in heavy duty applications such as on cruiser style bicycles or industrial three wheel vehicles. The tapered legs 28, 30 are sturdy, attractive in appearance and do not interfere with the front and rear fender braces 20, 22 upon mounting to the front wheel axle 18.

While the invention has been described with reference to a preferred embodiment, it will be understood by those skilled in the art that various changes may be made and equivalents may be substituted for elements thereof without departing from the essential scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A front bicycle fork for mounting the front wheel of a bicycle to a bicycle frame, comprising:
   a fork tube adapted to mount to the bicycle frame;
   a pair of spaced legs each having an upper section and an elongated lower section;
   said upper section of each said legs being substantially circular in cross section, said upper sections being fixedly connected to said fork tube;
   said elongated lower section of each said legs having an outer wall, a hollow center, a lower end, and an upper end connected to said upper section, said outer wall of said elongated lower section being bent inwardly to form a crease having spaced sidewalls extending longitudinally along said elongated lower section, said crease extending progressively further into said hollow interior from said upper end to said lower end of said elongated lower section so that said elongated lower section tapers inwardly from said upper end to said lower end;
   a mounting plate fixedly connected between said spaced sidewalls of said crease at said lower end of each of said legs, said mounting plates being adapted to mount said legs to the front wheel of the bicycle.

* * * * *